US012561196B2

(12) United States Patent
Hamasaki et al.

(10) Patent No.: US 12,561,196 B2
(45) Date of Patent: Feb. 24, 2026

(54) INFORMATION PROCESSING DEVICE

(71) Applicant: TOYOTA JIDOSHA KABUSHIKI KAISHA, Toyota (JP)

(72) Inventors: Yutaka Hamasaki, Toyota (JP); Hiroshi Shikata, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/776,517

(22) Filed: Jul. 18, 2024

(65) Prior Publication Data

US 2025/0130883 A1 Apr. 24, 2025

(30) Foreign Application Priority Data

Oct. 19, 2023 (JP) ................................. 2023-180420

(51) Int. Cl.
*G06F 11/07* (2006.01)
*G06F 3/147* (2006.01)
*G09G 5/14* (2006.01)

(52) U.S. Cl.
CPC ............ *G06F 11/079* (2013.01); *G06F 3/147* (2013.01); *G06F 11/0739* (2013.01)

(58) Field of Classification Search
CPC .................................................... G06F 11/079
See application file for complete search history.

(56) References Cited

U.S. PATENT DOCUMENTS

| | | | |
|---|---|---|---|
| 2007/0074076 A1* | 3/2007 | Imai | H04L 41/0631 |
| | | | 714/E11.026 |
| 2008/0155548 A1* | 6/2008 | Dettinger | G06F 11/0781 |
| | | | 707/E17.007 |
| 2011/0063099 A1* | 3/2011 | Miller | G09B 19/16 |
| | | | 340/439 |
| 2011/0138230 A1* | 6/2011 | Nakatani | G06F 11/1645 |
| | | | 714/E11.029 |
| 2018/0024898 A1* | 1/2018 | Yoshikawa | G06F 11/0712 |
| | | | 714/4.11 |
| 2021/0020145 A1* | 1/2021 | Hirata | G09G 5/38 |

FOREIGN PATENT DOCUMENTS

JP H10-181482 A 7/1998

* cited by examiner

*Primary Examiner* — Davetta W Goins
*Assistant Examiner* — Pameshanand Mahase
(74) *Attorney, Agent, or Firm* — SoraIP, Inc.

(57) ABSTRACT

An information processing device includes: an acquisition unit configured to acquire a first program for causing a display unit to display specific information specific to a target vehicle, and a second program for causing the display unit to display common information common to the target vehicle and another vehicle; and a control unit configured to, when first identification information assigned to the first program acquired by the acquisition unit and second identification information assigned to the second program acquired by the acquisition unit do not agree with each other, perform predetermined control for alerting that the first identification information and the second identification information do not agree with each other.

5 Claims, 5 Drawing Sheets

INFORMATION PROCESSING DEVICE

CROSS-REFERENCE TO RELATED APPLICATION

This application claims priority to Japanese Patent Application No. 2023-180420 filed on Oct. 19, 2023, incorporated herein by reference in its entirety.

BACKGROUND

1. Technical Field

The present disclosure relates to an information processing device.

2. Description of Related Art

Japanese Unexamined Patent Application Publication No. 10-181482 (JP 10-181482 A) discloses a vehicle control device that achieves both updating responding to changes in road data over time and vehicle control specific to a vehicle.

SUMMARY

The technology of JP 10-181482 A includes, as the vehicle control device, a navigation device that performs route guidance based on map data. In recent years, notification is generally given using an in-vehicle display as in the navigation device.

When display control on the in-vehicle display is performed based on a plurality of programs, the timings to write the programs into an electronic control unit (ECU) of the vehicle may differ among the programs. Hitherto, an error may occur in the writing into the ECU, as typified by forgetting to write a predetermined program or writing a wrong program. Therefore, there is room for improvement.

Therefore, an object of the present disclosure is to provide an information processing device capable of easily finding a writing error occurring in a program for performing display control on an in-vehicle display.

An information processing device according to one aspect of the present disclosure includes:
an acquisition unit configured to acquire a first program for causing a display unit to display specific information specific to a target vehicle, and a second program for causing the display unit to display common information common to the target vehicle and another vehicle; and a control unit configured to, when first identification information assigned to the first program acquired by the acquisition unit and second identification information assigned to the second program acquired by the acquisition unit do not agree with each other, perform predetermined control for alerting that the first identification information and the second identification information do not agree with each other.

In the information processing device according to the above aspect, the acquisition unit acquires the first program and the second program. When the first identification information assigned to the first program acquired by the acquisition unit and the second identification information assigned to the second program acquired by the acquisition unit do not agree with each other, the control unit performs the predetermined control for alerting that the first identification information and the second identification information do not agree with each other. With the information processing device, it is possible to easily find, by performing the predetermined control, a writing error occurring in at least one of the first program and the second program as the programs for performing display control on the in-vehicle display. With the information processing device, even if a writing error occurs in the program for performing display control on the in-vehicle display, it is possible to find the writing error at an early stage and reduce the possibility that the vehicle having the writing error is delivered to a user.

In the information processing device according to the above aspect, the control unit may be configured to, as the predetermined control, cause the display unit to perform false display that is not performed in a normal state of the target vehicle.

In the information processing device according to the above aspect, as the predetermined control, the control unit causes the display unit to perform the false display that is not performed in the normal state of the target vehicle. With the information processing device, it is possible to grasp, by performing the false display on the display unit, that an abnormality has occurred in the vehicle when viewing the display unit, and to indirectly alert that the first identification information and the second identification information do not agree with each other.

In the information processing device according to the above aspect, the control unit may be configured to, as the false display, turn on at least one of a predetermined alert lamp and a predetermined indicator lamp that are not turned on in the normal state of the target vehicle among alert lamps and indicator lamps provided in the display unit.

In the information processing device according to the above aspect, as the false display, the control unit turns on at least one of the predetermined alert lamp and the predetermined indicator lamp that are not turned on in the normal state of the target vehicle among the alert lamps and the indicator lamps provided in the display unit. In the information processing device, at least one of the predetermined alert lamp and the predetermined indicator lamp is turned on at a timing when it is not turned on in the normal state of the target vehicle. Thus, it is possible to grasp that an abnormality has occurred in the vehicle when viewing the display unit, and to indirectly alert that the first identification information and the second identification information do not agree with each other. With the information processing device, an alert can be given without preparing a dedicated icon or the like by using, for the false display, at least one of the alert lamp and the indicator lamp provided in advance in the target vehicle.

In the information processing device according to the above aspect, the control unit may be configured to output diagnosis information indicating that the first identification information and the second identification information do not agree with each other.

In the information processing device according to the above aspect, the control unit outputs the diagnosis information indicating that the first identification information and the second identification information do not agree with each other. With the information processing device, it is possible to easily grasp, by connecting an external diagnosis device to the vehicle, that the first identification information and the second identification information do not agree with each other based on the diagnosis information.

In the information processing device according to the above aspect, the control unit may be configured to, as the predetermined control, cause the display unit to display visible information indicating that the first identification information and the second identification information do not agree with each other.

In the information processing device according to the above aspect, as the predetermined control, the control unit causes the display unit to display the visible information indicating that the first identification information and the second identification information do not agree with each other. With the information processing device, it is possible to easily grasp, by displaying the visible information on the display unit, that the first identification information and the second identification information do not agree with each other based on the visible information.

As described above, in the information processing device according to the present disclosure, it is possible to easily find a writing error occurring in the program for performing display control on the in-vehicle display.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a second explanatory diagram illustrating a specific embodiment of predetermined control; and FIG. 6 is a third explanatory diagram illustrating a specific example of predetermined control.

DETAILED DESCRIPTION OF EMBODIMENTS

Hereinafter, the vehicle 10 according to the present embodiment will be described.

Figure 1:
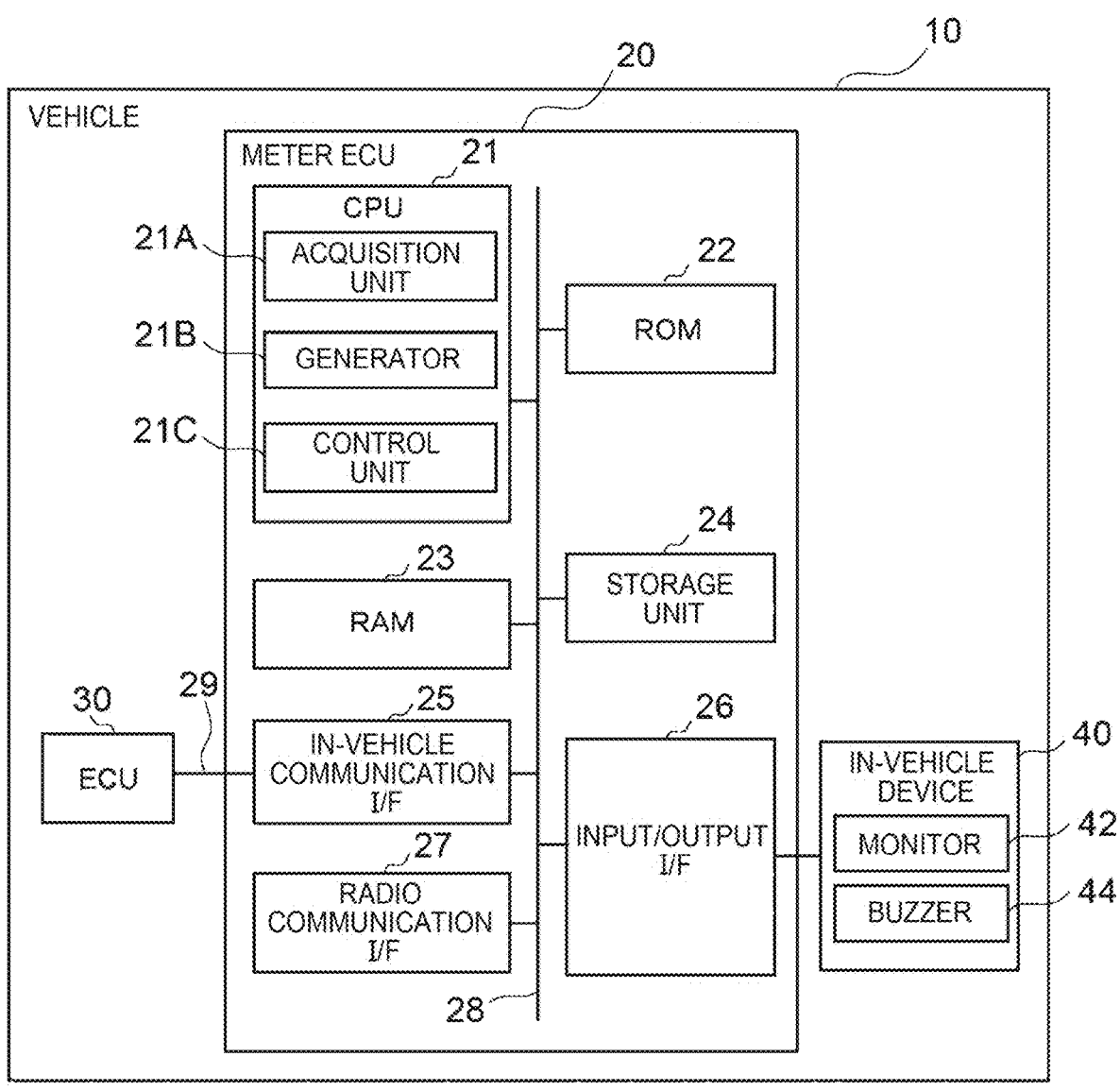
FIG. 1 is a block diagram illustrating a hardware configuration of a vehicle.

FIG. 1 is a block diagram illustrating a hardware configuration of a vehicle 10. As illustrated in FIG. 1, the vehicle 10 includes a meter ECU 20. The meter ECU 20 is an exemplary "information processing device".

The meter ECU 20 includes a CPU 21, a ROM 22, a RAM 23, a storage unit 24, an in-vehicle communication I/F 25, an input/output I/F 26, and a radio communication I/F 27. CPU is an abbreviation for Central Processing Unit. ROM is an abbreviation for Read Only Memory. RAM is an abbreviation for Random Access Memory. I/F is an abbreviation for interface. CPU 21, ROM 22, RAM 23, the storage unit 24, the in-vehicle communication I/F 25, the input/output I/F 26, and the radio communication I/F 27 are communicably connected to each other via an inner bus 28.

CPU 21 is a central processing unit that executes various programs and controls each unit. That is, CPU 21 reads the program from ROM 22 or the storage unit 24, and executes the program using RAM 23 as a working area. CPU 21 performs control of the above-described configurations and various arithmetic processes in accordance with programs recorded in ROM 22 or the storage unit 24.

ROM 22 stores various programs and various data. RAM 23 temporarily stores a program/data as a working area.

The storage unit 24 is constituted by a storage device such as an embedded multi-media card (eMMC) or a Universal Flash Storage (UFS), and stores various programs and various data.

Figure 2:
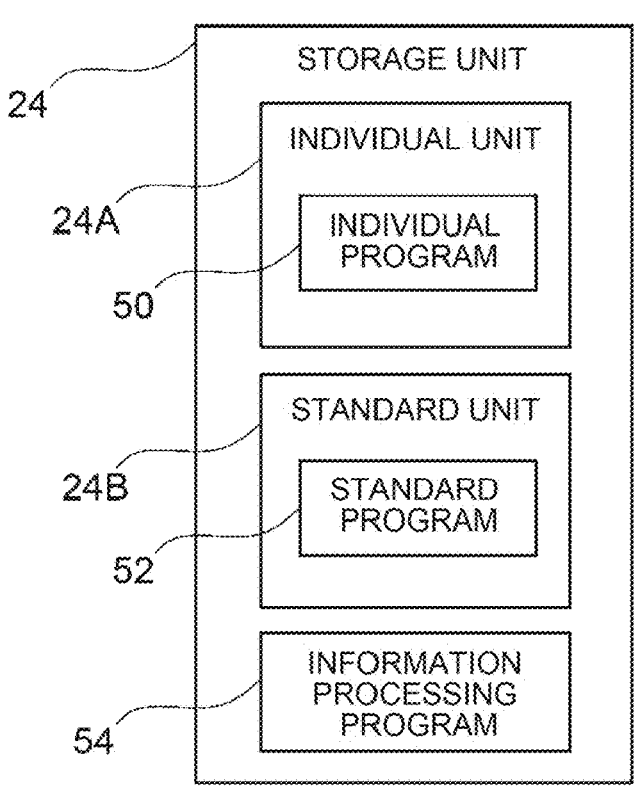
FIG. 2 is a block diagram illustrating a configuration of a storage unit.

FIG. 2 is a block diagram illustrating a configuration of the storage unit 24. As illustrated in FIG. 2, the storage unit 24 includes two storage areas, an individual unit 24A and a standard unit 24B.

The individual program 50 is stored in the individual unit 24A. The individual program 50 is a program dedicated to the host vehicle for displaying specific information specific to the host vehicle on a monitor 42 to be described later. In the present embodiment, a plurality of types of individual programs 50 are provided for each vehicle type. The individual program 50 is stored in the individual unit 24A by writing the individual programs 50 corresponding to the respective vehicle types. In the present embodiment, the host vehicle is the vehicle 10. The specific information includes, for example, a shape of the vehicle 10, a body color, an open/closed state of the door, and the number of doors. The individual program 50 is an example of a "first program".

The standard unit 24B stores a standard program 52. The standard program 52 is a program for displaying common information common to the vehicle 10 and other vehicles on the monitor 42. In the present embodiment, the standard program 52 is stored in the standard unit 24B by the staff of the meter component plant writing the standard program 52. As described above, the individual program 50 and the standard program 52 have different timings for writing the program into the storage unit 24 of the meter ECU 20.

In addition, in the present embodiment, the other vehicle is a vehicle of a different type from the vehicle 10 that is the host vehicle. The common information includes, for example, a vehicle speed, an outside air temperature, a current time, and the like of the vehicle 10. The standard program 52 is an example of a "second program".

Here, the individual program 50 and the standard program 52 are respectively assigned program ID that are unique identification (ID) that can specify the respective programs. The program ID includes, for example, a plurality of digits. Hereinafter, the program ID assigned to the individual program 50 is referred to as "first program ID", and the program ID assigned to the standard program 52 is referred to as "second program ID". The first program ID is an example of "first identification information", and the second program ID is an example of "second identification information".

The storage unit 24 stores an information processing program 54. The information processing program 54 is a program for causing CPU 21 to execute a determination process (see FIG. 3) to be described later.

Returning to FIG. 1, the in-vehicle communication I/F 25 is an interface for connecting to another ECU 30. The interface uses a CAN protocol-based communication standard. The in-vehicle communication I/F 25 is connected to an external bus 29. Although not shown, a plurality of ECU is provided for each function of the vehicle 10 in addition to ECU 30.

The input/output I/F 26 is an interface for communicating with the in-vehicle device 40 mounted on the vehicle 10.

The in-vehicle device 40 is a variety of devices mounted on the vehicle 10. The vehicle 10 includes a monitor 42 and a buzzer 44 as an example of the in-vehicle device 40.

The monitor 42 is provided on the meter panel, and is a liquid crystal monitor for displaying an operation proposal related to the function of the vehicle 10, an image related to the explanation of the function, and the like. The monitor 42 is an example of a "display unit".

The buzzer 44 is provided in the meter panel and is a device for outputting a predetermined warning sound.

The radio communication I/F 27 is a wireless communication module for communicating with an external device. As the radio communication module, for example, communication standards such as 5G, LTE, Wi-Fi (registered trademark) and Bluetooth (registered trademark) are used.

Further, CPU 21 of the meter ECU 20 includes, as a functional configuration, an acquisition unit 21A, a generation unit 21B, and a control unit 21C. The respective functional configurations are realized by CPU 21 reading and executing at least one of the individual program 50, the standard program 52, and the information processing program 54 stored in the storage unit 24.

The acquisition unit 21A acquires various types of data. For example, the acquisition unit 21A acquires data input from ECU 30 via the in-vehicle communication I/F 25, data input from a sensor group (not shown) as the in-vehicle device 40 via the input/output I/F 26, and the like as various types of information.

Further, the acquisition unit 21A acquires the individual program 50 from the individual unit 24A, and acquires the standard program 52 from the standard unit 24B.

The generation unit 21B generates display data to be displayed on the monitor 42 based on the individual program 50 and the standard program 52 acquired by the acquisition unit 21A.

The control unit 21C causes the monitor 42 to display the display data generated by the generation unit 21B.

The first program ID is assigned to the individual program 50 acquired by the acquisition unit 21A. The second program ID is assigned to the standard program 52. When the first program ID and the second program ID do not coincide with each other, the control unit 21C performs predetermined control to warn that the first program ID and the second program ID do not coincide with each other. When the first program ID and the second program ID do not coincide with each other, the obtained first program ID and the obtained second program ID may differ from each other. When the first program ID and the second program ID do not coincide with each other, at least one of the first program ID and the second program ID may not be acquired. A specific example of the predetermined control will be described later.

Figure 3:
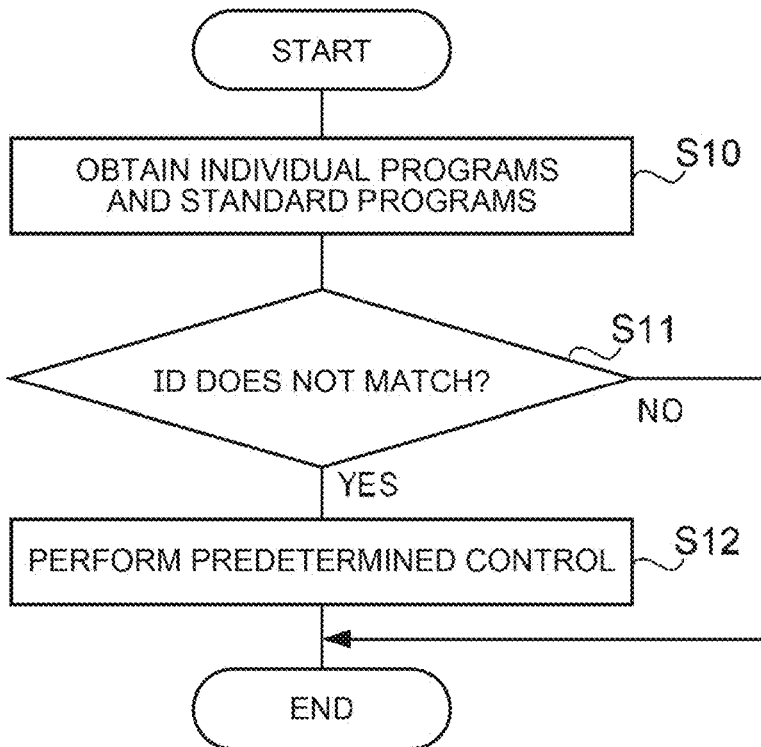
FIG. 3 is a flowchart illustrating a flow of a control process.

FIG. 3 is a flow chart showing a flow of a determination process of determining whether the first program ID to which the meter ECU 20 is added to the individual program 50 matches the second program ID to which the standard program 52 is added. The determination process is performed by CPU 21 reading the information processing program 54 from the storage unit 24, expanding the information processing program into a RAM 23, and executing the program. As an example, the determination process illustrated in FIG. 3 is periodically executed when an ignition switch (not illustrated) of the vehicle 10 is turned on.

In S10 illustrated in FIG. 3, CPU 21 acquires the individual program 50 from the individual unit 24A and acquires the standard program 52 from the standard unit 24B. Then, CPU 21 proceeds to S11.

In S11, CPU 21 determines whether or not the first program ID assigned to the individual program 50 acquired by S10 matches the second program ID assigned to the standard program 52. Here, if it is determined that the first program ID and the second program ID do not coincide with each other (S11: YES), CPU 21 proceeds to S12. On the other hand, when CPU 21 determines that the first program ID and the second program ID coincide with each other (S11: NO), the determination process ends.

In S12, CPU 21 performs predetermined control to warn that the first program ID and the second program ID do not coincide with each other. Then, CPU 21 ends the determination process.

Next, a specific embodiment of the predetermined control performed by the meter ECU 20 in S12 illustrated in FIG. 3 will be described. In the present embodiment, CPU 21 performs, as a function of the control unit 21C, a false indication, which is not performed in the normal condition of the vehicle 10, on the monitor 42 as a predetermined control. The normal state is a state of the vehicle 10 indicated by CAN in a state where the predetermined control is not performed. CPU 21 can grasp, for example, whether the vehicle 10 is in a running state, a state in which a warning light is turned on, a state in which an indicator light is turned on, and the like depending on the state of the vehicle 10.

Figure 4:
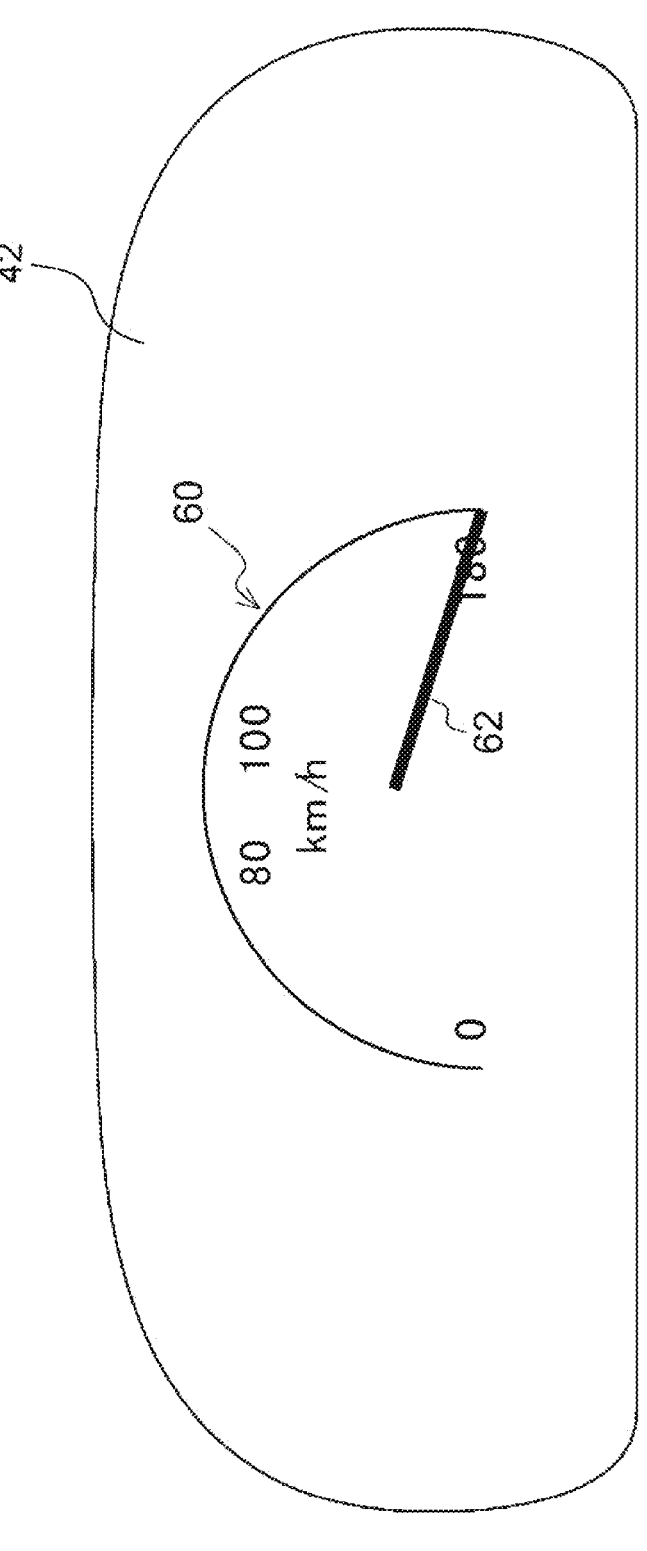
FIG. 4 is a first explanatory diagram illustrating a specific example of predetermined control.

FIG. 4 is a first explanatory diagram illustrating a specific example of predetermined control. Specifically, FIG. 4 illustrates a first example of a false display being performed on the monitor 42.

As shown in FIG. 4, a speedometer 60 is displayed in a central portion of the monitor 42. By way of example, the speedometer 60 can display the vehicle speed of the vehicle 10 between 0 km/h and 180 km/h using the needle 62.

Here, in a situation where the display illustrated in FIG. 4 is displayed on the monitor 42, it is correct that the vehicle 10 is stopped, and if the vehicle 10 is in a normal state, the needle 62 points to 0 km/h. In this instance, as shown in FIG. 4, CPU 21 controls the display content of the monitor 42 such that the needle 62 points to 180 km/h as a false display. As a result, the staff or the like of the dealer who looked at the monitor 42 can recognize that some abnormality has occurred in the vehicle 10. Further, since the vehicle 10 is stopped even if the false display shown in FIG. 4 is performed, the safety of the vehicle 10 is not affected.

Figure 5:
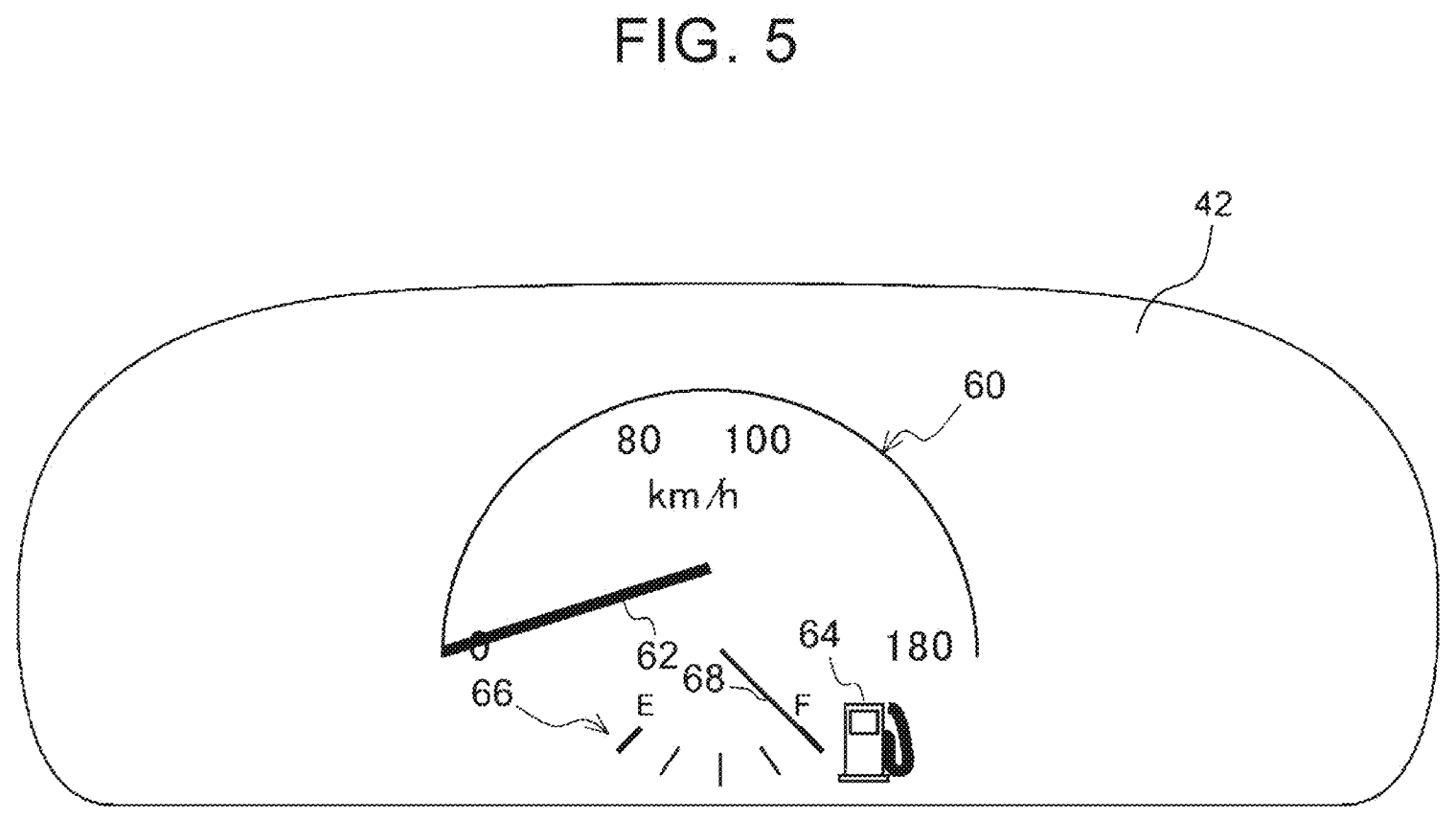

FIG. 5 is a second explanatory diagram illustrating a specific example of predetermined control. Specifically, FIG. 5 illustrates a second example of a false display being performed on the monitor 42.

As illustrated in FIG. 5, a fuel remaining amount warning lamp 64 and a fuel gauge 66 are displayed at a lower portion of the speedometer 60 in the monitor 42. In FIG. 5, the needle 62 indicates 0 km/h.

Here, in a situation where the display example shown in FIG. 5 is displayed on the monitor 42, the fuel of the vehicle 10 is replenished to the full state, and the fuel remaining amount warning lamp 64 is not turned on when the vehicle 10 is in the normal state. Specifically, in FIG. 5, the needle 68 of the fuel gauge 66 indicates F (Full), and does not indicate E (Empty) at which the fuel remaining amount warning lamp 64 is lit under normal conditions. In this situation, as shown in FIG. 5, CPU 21 turns on the fuel remaining amount warning lamp 64 as a false indication and displays it on the monitor 42. Thus, by looking at the monitor 42, it is possible to recognize that some abnormality has occurred in the vehicle 10. The fuel remaining amount warning lamp 64 is an example of a "predetermined warning lamp".

Here, when the false indication shown in FIG. 4 or FIG. 5 is performed on the monitor 42, CPU 21 outputs a dialog indicating that the first program ID and the second program ID do not coincide with each other. The output diagnosis information is stored in the storage unit 24. Then, when a staff member or the like of the dealer who has seen the monitor 42 connects the external diagnostic device to the vehicle 10, the external diagnostic device reads the diagnosis information stored in the storage unit 24, and displays the contents indicated by the diagnosis information by, for example, characters. As a result, it is possible to allow the staff of the dealer or the like to easily recognize that the first program ID and the second program ID do not coincide with each other.

Figure 6:
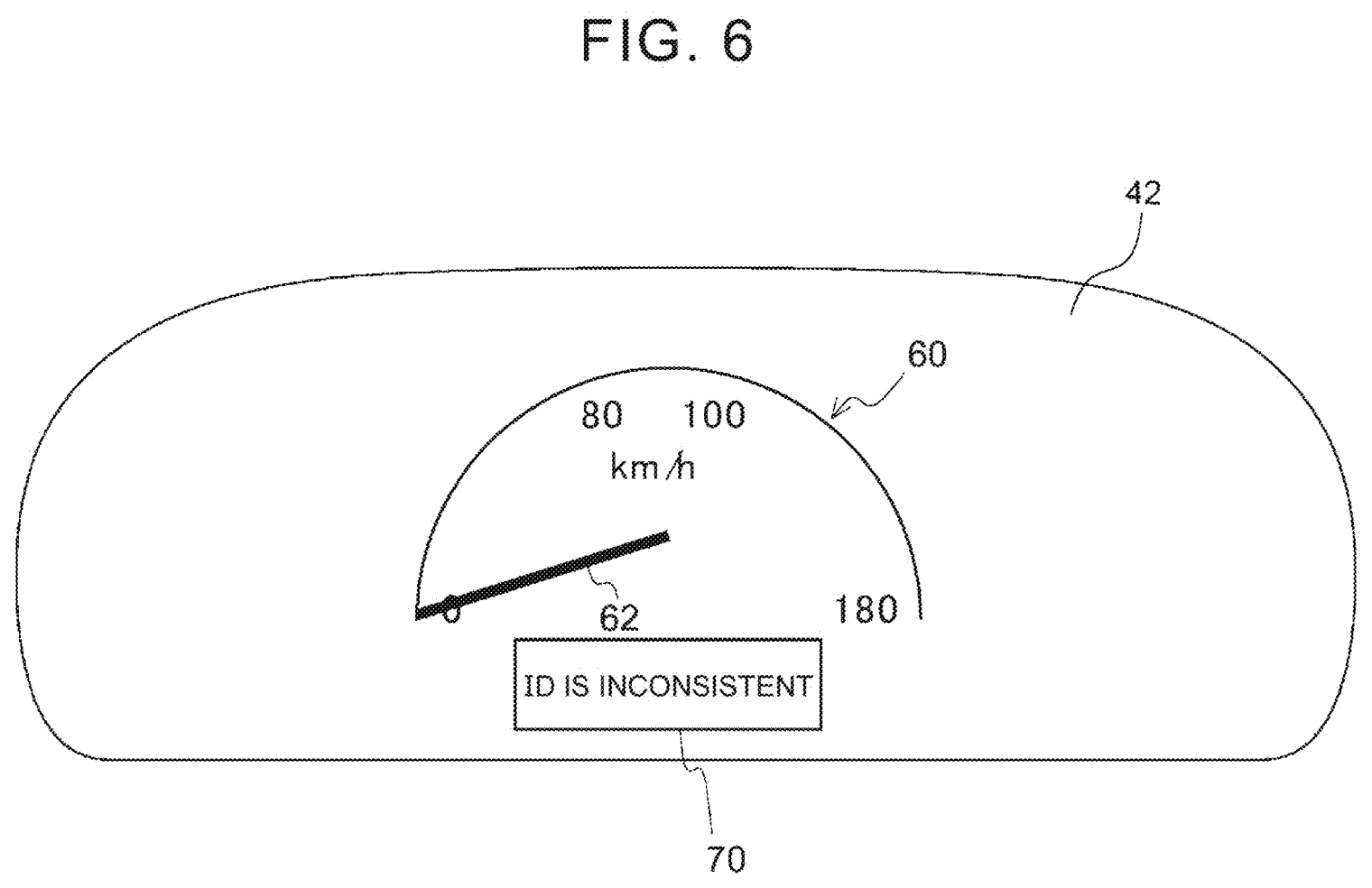

FIG. 6 is a third explanatory diagram illustrating a specific example of predetermined control. As illustrated in FIG. 6, CPU 21 displays, as predetermined control, character information 70 indicating that the first program ID and the second program ID do not coincide with each other on the monitor 42. The character information 70 is a character string that is not displayed on the monitor 42 when the vehicle 10 is in a normal state. The character information 70 is an example of "visible information".

In FIG. 6, the character information 70 is displayed at a lower portion of the speedometer 60. As an example, in FIG. 6, the character "ID does not match" is displayed as the character information 70. Thus, when the monitor 42 is viewed, it is possible to easily recognize that the first program ID and the second program ID do not coincide with each other. In FIG. 6, the needle 62 indicates 0 km/h.

As described above, in the meter ECU 20, CPU 21 acquires the individual program 50 and the standard program 52. When the first program ID and the second program ID do not coincide with each other, CPU 21 performs predetermined control to warn that the first program ID and the second program ID do not coincide with each other. However, the first program ID is assigned to the acquired individual program 50. The second program ID is assigned to the standard program 52. Thus, according to the meter ECU 20, by performing predetermined control, it is possible to easily discover that a write error has occurred in at least one of the individual program 50 and the standard program 52. As a result, even if a write error occurs in at least one of the individual program 50 and the standard program 52, the staff of the dealer or the like can detect the write error at an early stage. Therefore, according to the meter ECU 20, it is possible to reduce the possibility that the vehicle 10 in which a writing error has occurred in the hand of the user (end user) who uses the vehicle 10 crosses.

Further, in the meter ECU 20, CPU 21 performs, as predetermined control, false displaying on the monitor 42 which is not performed in the normal condition of the vehicle 10. According to the meter ECU 20, the false indication is performed on the monitor 42. As a result, it is possible to make the staff of the dealer who looked at the monitor 42 recognize that any abnormal condition has occurred in the vehicle 10, and to indirectly warn that the first program ID and the second program ID do not coincide with each other.

Further, in the meter ECU 20, CPU 21 turns on the fuel remaining amount warning lamp 64, which is not lit in the normal condition of the vehicle 10, among the warning lamps provided in the monitor 42, as a false indication (see FIG. 5). According to the meter ECU 20, the fuel remaining amount warning lamp 64 is lighted at a timing at which the lamp is not lighted in the normal condition of the vehicle 10. As a result, it is possible to make the staff of the dealer who looked at the monitor 42 recognize that any abnormal condition has occurred in the vehicle 10, and to indirectly warn that the first program ID and the second program ID do not coincide with each other. In addition, according to the meter ECU 20, by using the fuel remaining amount warning lamp 64 mounted in advance in the vehicle 10 for false indication, it is possible to give a warning without preparing a dedicated icon or the like.

In the meter ECU 20, CPU 21 outputs a dialog indicating that the first program ID and the second program ID do not coincide with each other. Accordingly, according to the meter ECU 20, by connecting the external diagnostic device to the vehicle 10, it is possible to allow the staffs of the dealer or the like to easily recognize that the first program ID and the second program ID do not coincide with each other based on the diagnosis information. Here, the staff of the dealer is, for example, an operator holding an external diagnostic device, a maintenance person, or the like. It should be noted that the object for recognizing that the first program ID and the second program ID do not coincide with each other may be a worker or a maintenance person of the manufacturer who performs inspection prior to shipping from the factory.

Further, in the meter ECU 20, CPU 21 causes the monitor 42 to display, as predetermined control, character information 70 indicating that the first program ID and the second program ID do not coincide with each other. Thus, according to the meter ECU 20, by displaying the character information 70 on the monitor 42, it is possible to easily recognize that the first program ID and the second program ID do not coincide with each other based on the character information 70.

Others

In the above-described embodiment, the individual unit 24A and the standard unit 24B are provided in the storage unit 24 of the meter ECU 20, the individual program 50 is stored in the individual unit 24A, and the standard program 52 is stored in the standard unit 24B. However, the present disclosure is not limited thereto, and ECU in which the individual program 50 is stored and ECU in which the standard program 52 is stored may be different. For example, the meter ECU 20 may be provided with an individual unit 24A, the individual program 50 may be stored in the individual unit 24A, the standard unit 24B may be provided in ECU 30, and the standard program 52 may be stored in the standard unit 24B.

In the above-described embodiment, CPU 21 turns on the fuel remaining amount warning lamp 64, which does not turn on in the normal condition of the vehicle 10, among the warning lamps provided in the monitor 42, as the false indication, but is not limited thereto. For example, instead of or in addition to this, CPU 21 may turn on, as a false indication, a predetermined indication light that is not turned on in a normal condition of the vehicle 10, among the indication lights provided on the monitor 42.

In the above-described embodiment, the character information 70 is an example of "visible information", but the present disclosure is not limited thereto. For example, the image information indicating that the first program ID and the second program ID do not coincide with each other by an image may be an example of "visible information", or the combination of the character information 70 and the image information may be an example of "visible information".

In the above-described embodiment, CPU 21 performs predetermined control on the monitor 42, but the present disclosure is not limited thereto. For example, instead of or in addition to this, CPU 21 may perform predetermined control by the buzzer 44. Further, the predetermined control performed by the monitor 42 is not limited to the one described in the above embodiment, and may be, for example, adjusting the light intensity of the backlight of the monitor 42.

In the above-described embodiment, the first program ID and the second program ID are the same for a plurality of vehicle types, but the present disclosure is not limited thereto, and may be different for each vehicle type. For example, the first program ID and the second program ID for the vehicle type A may be different from the first program ID and the second program ID for the vehicle type B. As a result, when CPU 21 performs predetermined control, for example, it is possible to allow staffs or the like of the dealer to easily recognize the wrong writing when the individual program 50 of the vehicle type B is wrongly written in the individual unit 24A of the vehicle type A.

Note that the determination process executed by CPU 21 reading the software (program) in the above-described embodiment may be executed by various processors other than CPU. Examples of the processor include a PLD capable of changing a circuit configuration after manufacturing a FPGA or the like, and a dedicated electric circuit that is a processor having a circuit configuration designed exclusively for executing a particular process such as ASIC. FPGA is an abbreviation for Field-Programmable Gate Array. PLD is an abbreviation for Programmable Logic Device. ASIC is an abbreviation for Application Specific Integrated Circuit. Further, the determination process may be executed by one of these various processors, or may be executed by a combination of two or more processors (for example, a plurality of FPGA, a combination of CPU and FPGA, and the like) of the same type or different types. Further, a hardware structure of the various processors is, more specifically, an electric circuit in which circuit elements such as semiconductor elements are combined.

In the above-described embodiment, an aspect in which the individual program 50, the standard program 52, and the information processing program 54 are stored (installed) in the storage unit 24 in advance has been described, but the present disclosure is not limited thereto. The individual program 50, the standard program 52, and the information processing program 54 may be provided in a form recorded in a recording medium such as a CD-ROM, DVD-ROM, and a USB memory. CD-ROM is an abbreviation for Compact Disk Read Only Memory. DVD-ROM is an abbreviation for Digital Versatile Disk Read Only Memory. USB is an abbreviation for Universal Serial Bus. The individual program 50, the standard program 52, and the information processing program 54 may be downloaded from an external device via a network.

What is claimed is:

1. An information processing device comprising:
a processor; and
a memory storing executable instructions that cause the processor to:
acquire a first program that causes a display unit to display specific information specific to a host vehicle, the specific information including one or more of a shape of the host vehicle, a body color of the host vehicle, a number of doors of the host vehicle, and an open/closed state of the doors of the host vehicle;
acquire a second program that causes the display unit to display common information common to the host vehicle and other vehicles, the common information including one or more of a vehicle speed, an outside air temperature, and a current time;
compare first identification information assigned to the first program with second identification information assigned to the second program; and
determine whether the first identification information agrees with second identification information, wherein
the processor performs a notification control in response to determining that the first identification information does not agree with the second identification information to notify a user that the first identification information does not agree with the second identification information.

2. The information processing device according to claim 1, wherein
the notification control is a false display that is displayed on the display unit,
the false display indicates a state of the host vehicle that is contrary to an actual state of the host vehicle, and
the false display is not displayed while the host vehicle is traveling.

3. The information processing device according to claim 2, wherein
the false display includes
turning on at least one of a predetermined alert lamp and a predetermined indicator lamp that are not turned on while the vehicle is traveling and operating normally.

4. The information processing device according to claim 2, wherein the executable instructions further cause the processor to
output diagnosis information indicating that the first identification information and the second identification information do not agree with each other.

5. The information processing device according to claim 1, wherein
the notification control is displaying visible information on the display unit provided in the host vehicle, the visible information indicating that the first identification information and the second identification information do not agree with each other.

* * * * *